Sept. 9, 1958     W. L. MORRISON     2,851,173
CONVEYOR GATE AND GRID FOR COMPOSTING MACHINE
Filed July 16, 1953     4 Sheets-Sheet 1

Inventor
Willard L. Morrison
by Parker & Carter
Attorneys

Sept. 9, 1958   W. L. MORRISON   2,851,173
CONVEYOR GATE AND GRID FOR COMPOSTING MACHINE
Filed July 16, 1953   4 Sheets-Sheet 2

Inventor
Willard L. Morrison
by
Attorneys

Inventor
Willard L. Morrison
by Parker & Carter
Attorneys

Sept. 9, 1958 W. L. MORRISON 2,851,173
CONVEYOR GATE AND GRID FOR COMPOSTING MACHINE
Filed July 16, 1953 4 Sheets-Sheet 4

Inventor
Willard L. Morrison
by Parker & Carter
Attorneys

United States Patent Office 2,851,173
Patented Sept. 9, 1958

2,851,173

CONVEYOR GATE AND GRID FOR COMPOSTING MACHINE

Willard L. Morrison, Lake Forest, Ill., assignor to Union Stock Yards & Transit Company of Chicago, Chicago, Ill., a corporation of Illinois Application July 16, 1953, Serial No. 368,423

4 Claims. (Cl. 214—17)

My invention relates to improvements in composting apparatus and method of composting and has for one object to provide a means and apparatus whereby animal manure will be rapidly and effectively composted or digested so as to be available for plant food.

Another object of my invention is to provide such a mechanism as will result in uniform complete composting of animal manure.

Another object of my invention is to provide a combination support and conveyor whereby animal manure may be supported in an enclosure and may be conveyed out of such enclosure without causing a packing or building up of manure on any of the inside walls of such enclosure.

Other objects will appear from time to time throughout the specification and claims.

My invention is illustrated in a form suitable for co-operation with a composting apparatus as described and claimed in my co-pending application, Serial Number 254,380, filed November 1, 1951, and is a continuation in part of my co-pending application Serial No. 299,588, filed July 18, 1952, for "Conveyor Grid for Composting Machine," both of which cases are now abandoned.

I find that a grid or grate made up of a plurality of floor conveyor screws extending across the bottom of a chimney is effective to support a mass of manure and to continuously or periodically withdraw from the bottom of the mass a portion thereof. I find further, however, that when all of the floor conveyor screws turn in the same direction and at the same speed, a packing of the manure occurs along at least one of the inside walls of the manure enclosure. This is particularly unsatisfactory since the very purpose of the composting apparatus is to achieve a sufficiently granular or a finely divided condition in the manure for its suitable application to plants for plant food. Moreover, this packing and solidifying creates a necessity for repeated cleaning, and the prerequisite tearing down of parts of the apparatus.

This application is a continuation in part of my co-pending application, Serial Number 299,588, filed July 18, 1952, entitled Conveyor Grid for Composting Machine.

My invention is illustrated more or less diagrammatically in the accompanying drawings wherein.

Like parts are indicated by like characters throughout the specification and drawings.

Figure 1:
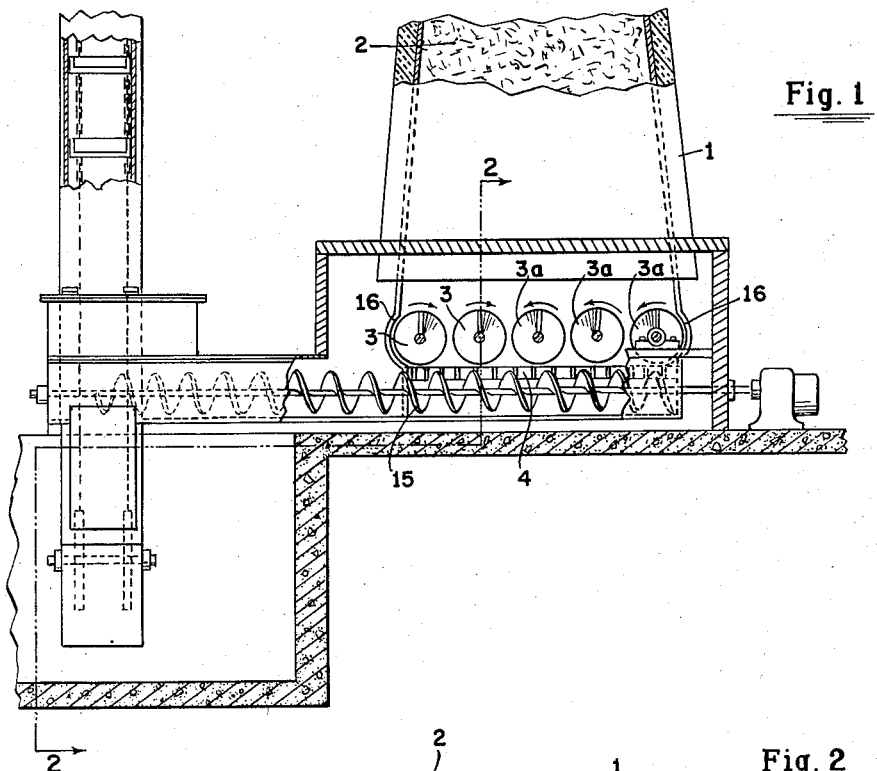
Figure 1 is a vertical elevation in part section of the lower portion of a composting machine.

1 generally indicates a digestion chamber which may take the form of a chimney open at top and bottom. 2 is a mass of manure contained within the chimney. Supporting the mass of manure is a grid or grate made up of a plurality of floor conveyor screws 3, 3a extending across the bottom of the chimney above a pervious floor 4. 5 is a plenum chamber below the floor 4. Rotation of the conveyor screws 3, 3a causes them to convey manure laterally across the bottom of the chimney for discharge from one side of the floor to a cross conveyor 15. It will be understood that the manure is conveyed by the cross conveyor 15 to a point at which it is discharged and to a vertical conveyor which carries the manure upwardly to a second cross conveyor which in turn discharges the manure to the top of the chimney 1. Since the structure involved in conveying the manure after its discharge from one side of the floor to its point of discharge to the top of the chimney 1 does not form a part of the present invention, it will not be further discussed.

It will be noted that the conveyor screws beneath the manure mass increase in diameter toward the discharge side of the floor 4. A purpose of this is to insure that manure will be withdrawn from the bottom of the pile or mass generally uniformly throughout its entire area.

I illustrate means for rotating the conveyor screws 3, 3a. 6 indicates a power source and 7 indicates a connection between the power source 6 and the sprockets 8, which connection may be of the endless chain type. It will be understood that the sprockets 8 are in fixed relation to the conveyor screws 3, 3a so as to rotate concurrently therewith. It will be noted that the conveyor screws 3 are made to rotate in a clockwise direction while the conveyor screws 3a rotate in a counterclockwise direction. While five conveyor screws are illustrated, it will be realized that the number may vary depending upon the size of the chimney and of the mass of manure to be moved.

As will be seen best in Figure 1, the conveyor screw 3a which is most centrally located is caused to turn at a faster rate of speed than the other conveyor screws since an additional amount of manure will be handled by this screw due to the directing of such additional manure toward it from each side by the other screws. It will be noted that the sprocket 8 on the most centrally located screw is of smaller diameter than the sprocket 8 on the other conveyor screws.

Figure 4:
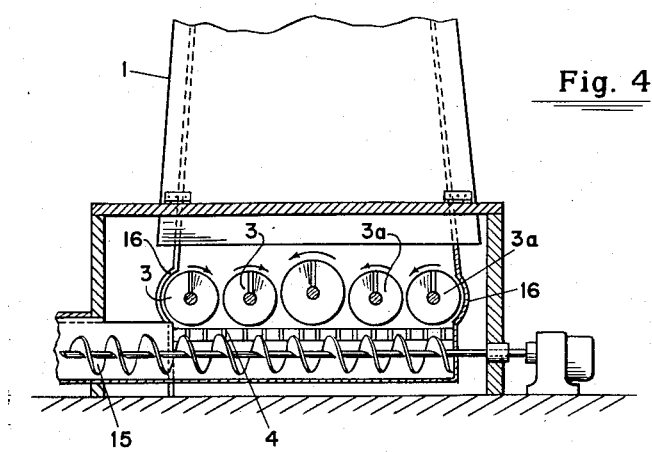
Figure 4 is a part section similar to Figure 1 showing a variant form of conveyor screw.

In the variant form shown in Figure 4 an alternate means for insuring that the most centrally located conveyor screw is effective to handle the additional amount of manure is illustrated. The center screw is in this form made larger than the other conveyor screws, the sprocket 8 on the center screw remaining of equal size with all of the other sprockets 8 if desired.

It is of the utmost importance that there be no bridging of the manure mass in the chimney. In order to insure that there be no bridging above the conveyor screws 3, 3a, the floor conveyor screws are so disposed that the outermost screws on each side of the tank or chimney project outwardly beneath the wall of the chimney. Thus there is no dead space between the screw and the chimney wall where material might hang up. The wall is curved slightly on each side to provide a clearance as indicated at 16 so that two of the floor screws 3, 3a may be in part beyond the normal area of the bottom of the mass.

Figure 5:
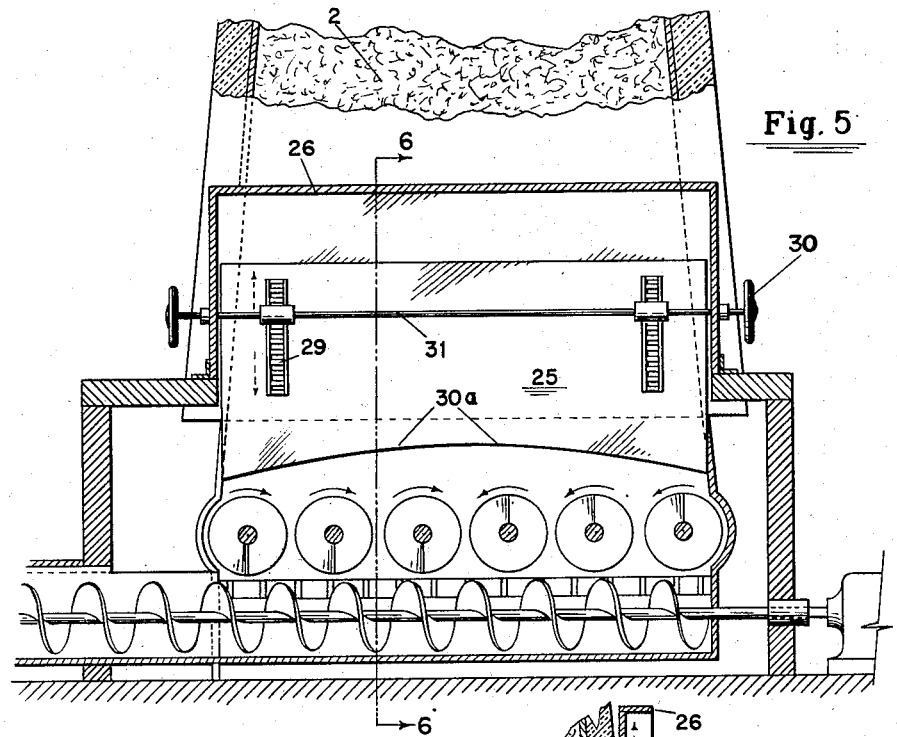
Figure 5 is a part section similar to Figure 4 showing a modified form.
Figure 6:
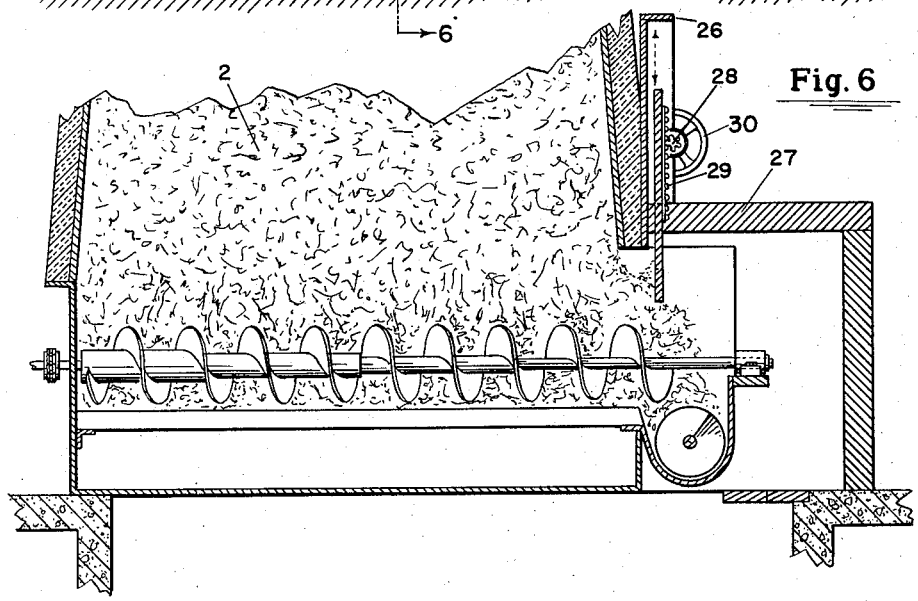
Figure 6 is a section along the line 6—6 of Figure 5.

In the modified forms shown in Figures 5 and 6 the gate 25 is mounted for movement in the housing 26 through the roof 27, the rotation of the gears 28 engaging the racks 29, the gears being rotated by the hand wheels 30 through the shaft 31. The lower boundary of the gate is upwardly curved from both ends toward the center as indicated at 30, the purpose of this arrangement being to permit varying the discharge port through which the manure is propelled by the floor screws. When wet or relatively moist manure in process of composting is conveyed laterally by the floor screws, because it is wet and sticky a relatively large opening is required to permit adequate movement of the manure along the live floor toward the cross conveyor screw 15. When the manure has been dried as it approaches or achieves complete composting the gate must be moved downwardly to prevent too great an outflow of the manure. Thus by the gate arrangement shown the port through which the manure is discharged from the column may be adjusted accurately in consonance with the character of the material passing through the gate.

The upward curvature of the gate is provided because as the screws on opposite sides of the live floor rotate in opposite directions they tend to propel the manure along the floor in the direction of discharge but they also tend to propel the manure inwardly away from the walls; thus manure tends to pile up along the center of the floor and more room is needed to insure outward flow and minimize packing of the manure.

Figure 2:
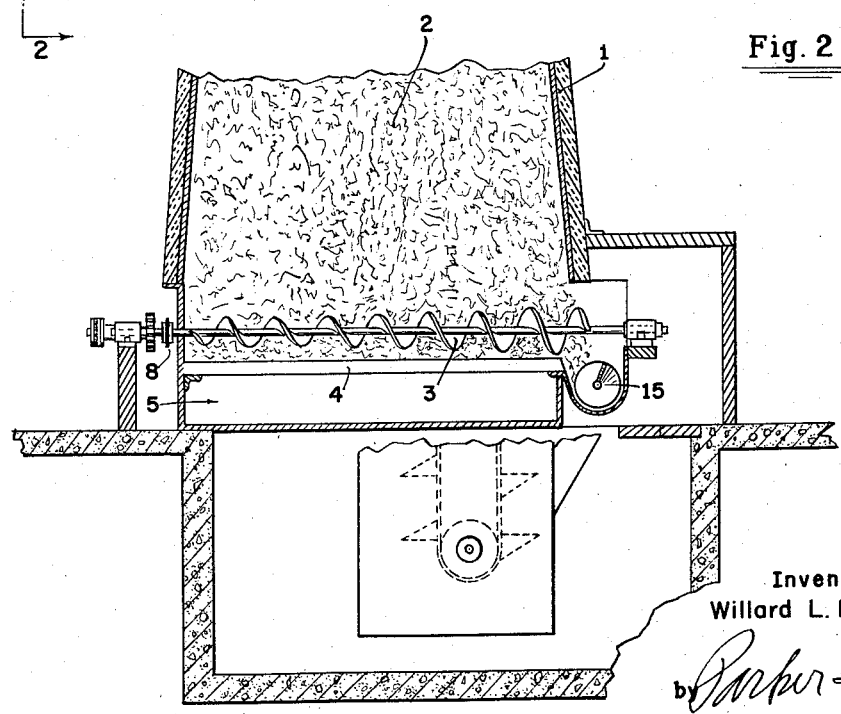
Figure 2 is a section on the line 2—2 of Figure 1.
Figure 3:
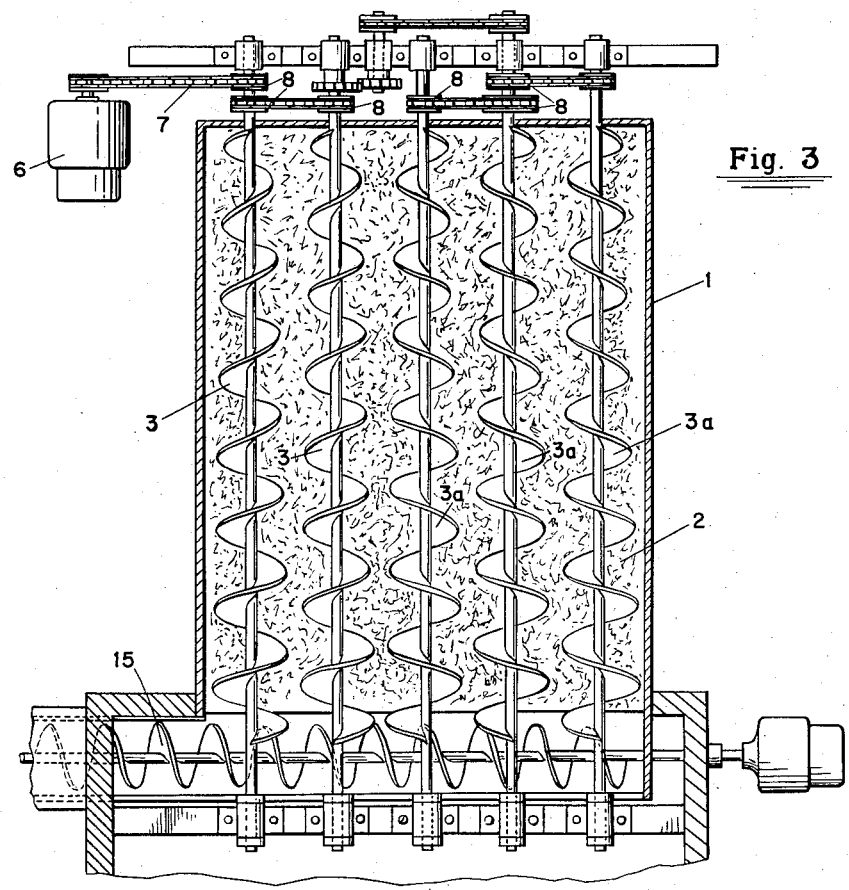
Figure 3 is a section on an enlarged scale along the line 3—3 of Figure 1.
Figure 7:
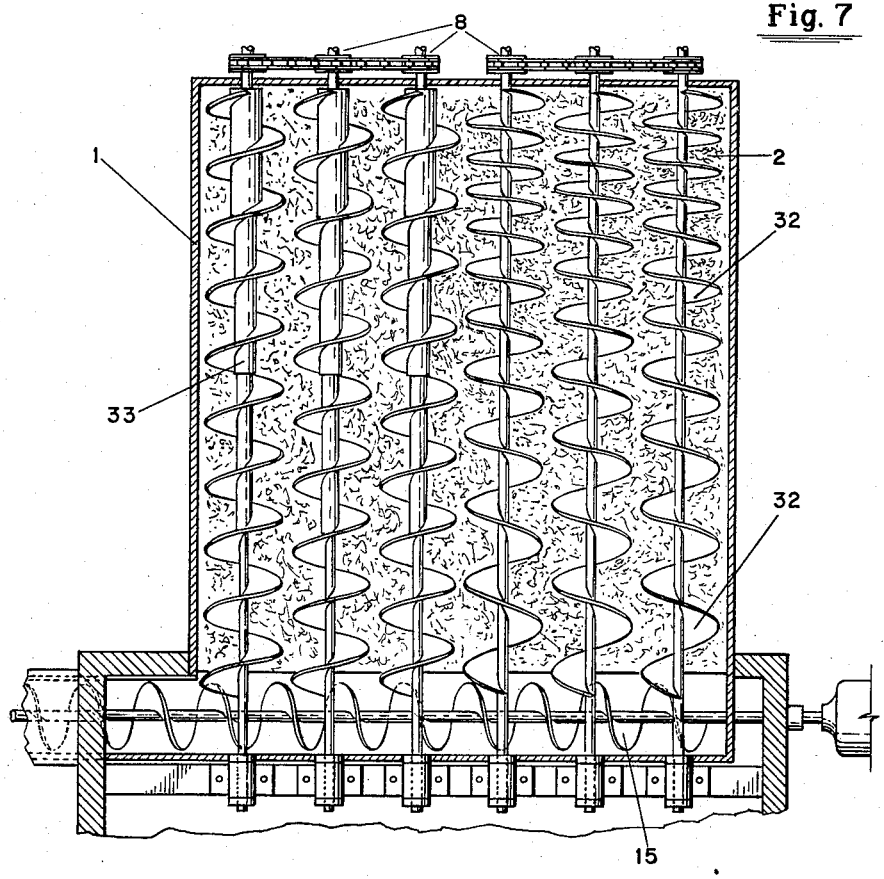
Figure 7 is a section similar to Figure 3 showing a modified form.
Figure 8:
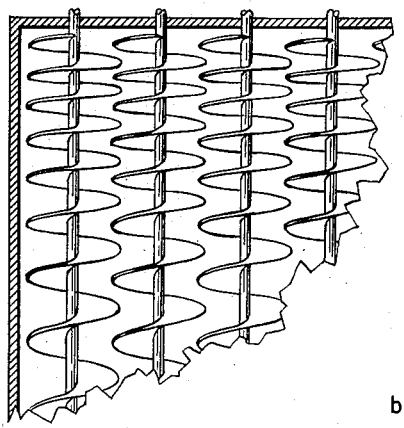
Figure 8 is a part section similar to Figure 7 showing a further modified form.

Referring now to Figures 7 and 8, modified details of the floor screws are shown. It will, of course, be understood that in order to remove substantially the same amount of manure from the bottom of the column throughout its entire surface some special provision must be made. Figure 2 accomplishes this by decreasing the radius of the screw flights. This is accomplished on the right hand side of Figure 7 by increasing the pitch of the screws 32 in the direction of discharge and on the left hand side of Figure 7 by decreasing the thickness of the screw shaft 33 in the direction of discharge. In either one of these solutions of the problem the screw tends to take off from the bottom of the pile of manure substantially the same amount throughout the entire area of the column, since the capacity of the screw in each case increases in the direction of discharge, the screw is able to take off equal quantities and still able to handle the material from further up the stream.

In the modified form shown in Figure 8 the flights overlap, that is, the peripheries of the various screws are close enough together so that there is no dead space between them.

The pressure of the manure mass supported partially on the screws and partially on the foraminous floor and at certain stages in the operation the glutenous character of the mass is such that it is frequently highly desirable that there be no space anywhere along the floor where any particle of manure may fail to be caught by and propelled by the screws. If the spacing of the screws or helical flights is such that they overlap or interlock, of course, without contacting each other, then no body of the manure can fail to be reached and complete removal of all of the lower layer of the manure in the chimney or composting chamber results.

I have shown several modifications of the conveyor means for removing the manure from the bottom of the pile, because a multiplicity of suitable means might be devised.

The particular details I have shown emphasize the fact that any conveying means which will not pile the manure up against the walls of the chimney and which will remove material from the bottom of the pile at a generally uniform rate with respect to every part of the floor area is satisfactory for the operation I propose.

The use and operation of my invention are as follows:

The chimney is first filled with raw manure. The floor conveyor screws are close enough together so that they tend to support the mass but, of course, the mass of the manure penetrates down between the screws or across the screws to rest finally upon the foraminous floor, which merely takes the form of a plurality of parallel bars so as to provide grate slots. Air may pass upwardly from below the foraminous floor between the conveyor screws upwardly through the mass out at the top. Usually it is desirable to expedite digestion by forcing air under pressure upwardly through the mass by controlling the temperature and moisture of the air so as to bring about optimum conditions for the life and multiplication of the microbia.

Periodically or continuously, as the case may be, the floor conveyor screws are rotated and they scrape off or laterally remove from the bottom of the mass in the chimney the lower layers of manure. This manure is laterally discharged from the ends of the conveyor screws and then conveyed upwardly and then again laterally discharged to the top of the mass.

The entire weight of the mass of manure is supported by the screws so that when the screws are operated to move part of the mass laterally, the mass settles right down and continues settling down so as to remain in contact with the screw conveyor throughout the entire operation. In order to prevent packing or solidifying of the mass against the inside walls of the chimney or enclosure, I rotate some of my conveyor screws in a clockwise direction and the remainder of my conveyor screws in a counterclockwise direction, thus insuring that no manure is compacted against either of the side walls. Since manure is thus directed toward the center of the mass, I provide means for the accomplishment of a greater amount of work on the part of the most centrally located conveyor screws which consist in rotating this screw at a greater rate of speed than the speed of rotation of the other screws or in enlarging the most centrally located screw. Variations and combinations in providing a larger screw and rotating it at a faster rate than the other screws may be provided.

It is important to note that since the manure rests on the screws, rotary movement of the screw tends to move the manure along a path tangential to the upper portion of the screw so in order to prevent piling or packing the manure against the side walls, the screws nearest the walls must rotate so that tangential movement at the top of the screw is away from the wall. The other screws may work in consonance with the two side screws or in opposition thereto as the case may be. They may operate in groups as indicated or they may rotate alternating screws in opposite directions, the one factor being that the rotation of the screws is so related that they tend to urge the material away from the walls toward the center of the chimney, and also tend to move the lower layer of the mass as a continuous flowing sheet uniformly toward the discharge port.

The provision of the adjustable gate makes it possible to compensate for different conditions of the manure by changing the size of the gate. The curved lower edge of the gate assures that always there will be room for discharge of the layer of increased thickness at the center of the floor which results from the rotation of the screws in a direction to prevent compacting against the wall of the chimney.

I claim:

1. In combination, a receptacle defining a chamber and having a floor, walls extending upwardly therefrom, at least two of the walls being opposed to one another and inwardly inclined, a multiplicity of screw conveyors generally parallel with one another, with the opposed walls and with the floor, located immediately above the floor to define a supporting grid, the opposed walls being recessed to receive, overhang and generally conform to that portion of the adjacent periphery of the screw conveyor nearest to the wall, means for rotating the screw conveyors nearest to the opposed walls in unison in such a direction that the upper peripheries of each screw conveyor travels away from the adjacent opposed wall, a discharge port in another wall of the receptacle in register with the discharge ends of the screw conveyors, a gate for the port outside the chamber and means for raising and lowering it to control the effective discharge area of the port, the distance from the lower edge of the gate to the floor being a maximum adjacent the center and decreasing toward the ends of the gate, the capacity of the screw conveyors increasing across the floor toward the discharge port.

2. In combination, a receptacle defining a chamber and having a floor, walls extending upwardly therefrom, at least two of the walls being opposed to one another and inwardly inclined, a multiplicity of screw conveyors generally parallel with one another, with the opposed walls and with the floor, located immediately above the floor to define a supporting grid, the opposed walls being recessed to receive, overhang and generally conform to that portion of the adjacent periphery of the screw conveyor nearest to the opposed walls, means for rotating the screw conveyors in unison in such direction that the upper peripheries of the screw conveyors travel away from the adjacent opposed wall, a discharge port in another wall of the receptacle in register with the discharge ends of the screw conveyors, a gate for the port outside the chamber and means for raising and lowering it to control the effective discharge area of the port, the distance from the lower edge of the gate to the floor being a maximum adjacent the center and decreasing toward the ends of the gate.

3. In combination, a receptacle for composting manure and the like having a floor, walls extending upwardly therefrom, two of the walls being opposed to one another and inwardly inclined, a multiplicity of screw conveyors parallel with one another with the opposed walls and with the floor, located immediately above the floor to define a supporting grid, the opposed walls being recessed to receive, overhang and generally conform to that portion of the adjacent periphery of the screw conveyor nearest to the wall, means for rotating the screw conveyors in unison in such direction that the upper peripheries of the screw conveyors travel away from the adjacent opposed wall, a discharge port in another wall of the receptacle in register with the discharge ends of the screw conveyors, the effective opening of the port being at a maximum adjacent the center and increasing toward the ends thereof over the conveyors.

4. In combination, a receptacle for composting manure and the like having a floor, walls extending upwardly therefrom, two of the walls being opposed to one another, a multiplicity of screw conveyors parallel with one another with the opposed walls and with the floor, located immediately above the floor to define a supporting grid, the opposed walls being recessed to receive, overhang and generally conform to that portion of the adjacent periphery of the screw conveyor nearest to the wall, means for rotating the screw conveyors in unison in such direction that the upper peripheries of the screw conveyors travel away from the adjacent opposed wall, a discharge port in another wall of the receptacle in register with the discharge ends of the screw conveyors, the effective opening of the port being at a maximum adjacent the center and decreasing toward the ends thereof over the conveyors.

References Cited in the file of this patent

UNITED STATES PATENTS

| | | |
|---|---|---|
| 726,711 | Lewis | Apr. 28, 1903 |
| 1,544,957 | Tracy | July 7, 1925 |
| 1,750,645 | Offenhauser | Mar. 18, 1930 |
| 1,835,989 | Hofft et al. | Dec. 8, 1931 |
| 1,905,781 | Allington | Apr. 25, 1933 |
| 1,969,372 | Hogg | Aug. 7, 1934 |
| 2,569,969 | Baer | Oct. 2, 1951 |
| 2,570,864 | Rowlson | Oct. 9, 1951 |
| 2,608,395 | August | Aug. 26, 1952 |